(12) United States Patent
Pearson et al.

(10) Patent No.: US 10,911,250 B2
(45) Date of Patent: Feb. 2, 2021

(54) CHALLENGE RESPONSE AUTHENTICATION FOR SELF ENCRYPTING DRIVES

(71) Applicant: INTEL CORPORATION, Santa Clara, CA (US)

(72) Inventors: Adrian R. Pearson, Hillsboro, OR (US); Jason R. Cox, Longmont, CO (US); James Chu, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 159 days.

(21) Appl. No.: 15/871,726

(22) Filed: Jan. 15, 2018

(65) Prior Publication Data

US 2018/0176024 A1 Jun. 21, 2018

Related U.S. Application Data

(63) Continuation of application No. 14/668,657, filed on Mar. 25, 2015, now Pat. No. 9,871,663.

(51) Int. Cl.
*H04L 9/32* (2006.01)
*G06F 12/14* (2006.01)
*G06F 21/52* (2013.01)
*G06F 21/62* (2013.01)
*H04L 29/06* (2006.01)

(52) U.S. Cl.
CPC ........ *H04L 9/3271* (2013.01); *G06F 12/1408* (2013.01); *G06F 21/52* (2013.01); *G06F 21/6218* (2013.01); *H04L 9/3234* (2013.01); *H04L 9/3257* (2013.01); *H04L 63/061* (2013.01); *H04L 63/0823* (2013.01);
(Continued)

(58) Field of Classification Search
CPC ... H04L 9/3271; H04L 9/3234; H04L 9/3257; H04L 63/061; H04L 63/0823; H04L 63/0853; G06F 12/1408; G06F 21/52; G06F 21/6218; G06F 2212/1052; G06F 2221/2139
See application file for complete search history.

(56) References Cited

U.S. PATENT DOCUMENTS 8,613,387 B1 * 12/2013 Billett .................... G06F 21/57 235/379
2008/0125094 A1 * 5/2008 Heurtaux ............. H04L 9/3263 455/411
(Continued)

OTHER PUBLICATIONS

:\loonsang I\ won and Yooknn Cbo "Protecting Secret Keys with Blind Computation Service", SeoulNational University, 11 pages (Year: 2002).*
(Continued)

*Primary Examiner* — Catherine Thiaw
(74) *Attorney, Agent, or Firm* — Kacvinsky Daisak Bluni PLLC

(57) ABSTRACT

Various embodiments are directed to a system for accessing a self-encrypting drive (SED) based on a blind challenge authentication response mechanism (BCRAM). An SED may be authenticated within a system, for example, upon resuming from a sleep state, based on a challenge generated within the SED, signed using a private key by a trusted execution environment (TEE) and authenticated using a corresponding public key within the SED.

25 Claims, 10 Drawing Sheets

(52) U.S. Cl.
CPC .. *H04L 63/0853* (2013.01); *G06F 2212/1052* (2013.01); *G06F 2221/2139* (2013.01)

(56) References Cited

U.S. PATENT DOCUMENTS

2014/0237614 A1* 8/2014 Irvine ................. G06F 21/6218
726/26
2014/0258711 A1* 9/2014 Brannon ............. H04L 63/0823
713/156

OTHER PUBLICATIONS

Example of Digital Certificate, extracted from https://www.researchgate.net/figure/A-digital-certificate-example_fig1_47296903, Oct. 15, 2019 (Year: 2019).*

Milad Bahadori, Mohammad Reza Mali, Omid Sarbishei, Mojtaba Atarodi, Mohammad Sharifkhani "A Novel Approach for Secure and Fast Generation of RSA Public and Private Keys on SmartCard", IEEE, pp. 265-268 (Year: 2010).*

* cited by examiner

CHALLENGE RESPONSE AUTHENTICATION FOR SELF ENCRYPTING DRIVES

CROSS-REFERENCE TO RELATED APPLICATION

This application is a continuation of, claims the benefit of, and claims priority to U.S. patent application Ser. No. 14/668,657 filed on Mar. 25, 2015, the subject matter of which is incorporated herein by reference in its entirety.

TECHNICAL FIELD

Embodiments described herein generally relate to self-encrypting storage and particularly to authenticating self-encrypting storage volumes.

BACKGROUND

Modern storage volumes, such as, for example, solid state drives, conventional disk drives, or the like, may include the ability to "self-encrypt." In general, a self-encrypting drive (SED) is a storage volume (or drive) that encrypts and decrypts data on the volume. In particular, SEDs typically encrypt all the data (all the user data, or the like) on the drive. As such, when the drive is powered on, access credentials are used to "unlock" or decrypt the data. More particularly, during operation, the data is decrypted on the fly. Accordingly, when the drive is powered off, the data remains "locked" or encrypted so that unauthorized access to the data can be minimized In general, SEDs include circuitry to receive access credentials, decrypt the contents of the drive using the access credentials, and encrypt the contents of the drive upon shut down.

Many modern computing devices include a number of low power states. For example, sleep, hibernate, or the like. With some low power states, for example, sleep (or S3) large portions of the system are powered off while other portions (e.g., DRAM, or the like) are placed in a self refresh mode such that waking or resuming activity from the low power state is faster. In such states, the SED is typically powered off. As such, the contents of the SED are encrypted and upon waking, a user must reenter their credentials to access the drive.

With some computing systems, to maintain the user experience and functionality, the access credentials for the SED are cached (e.g., in the self refreshing DRAM, or the like) so that they can be reused upon resuming activity from a sleep state. However, it is noted, that this may provide security vulnerabilities as the access credentials can be captured when the credentials are reused. For example, the security credentials may be captured by a protocol analyzer, execution of malware, or even by moving the DRAM to another system to recover the access credentials.

It is with respect to these and other considerations that the embodiments described herein are needed.

DETAILED DESCRIPTION

Figure 1:
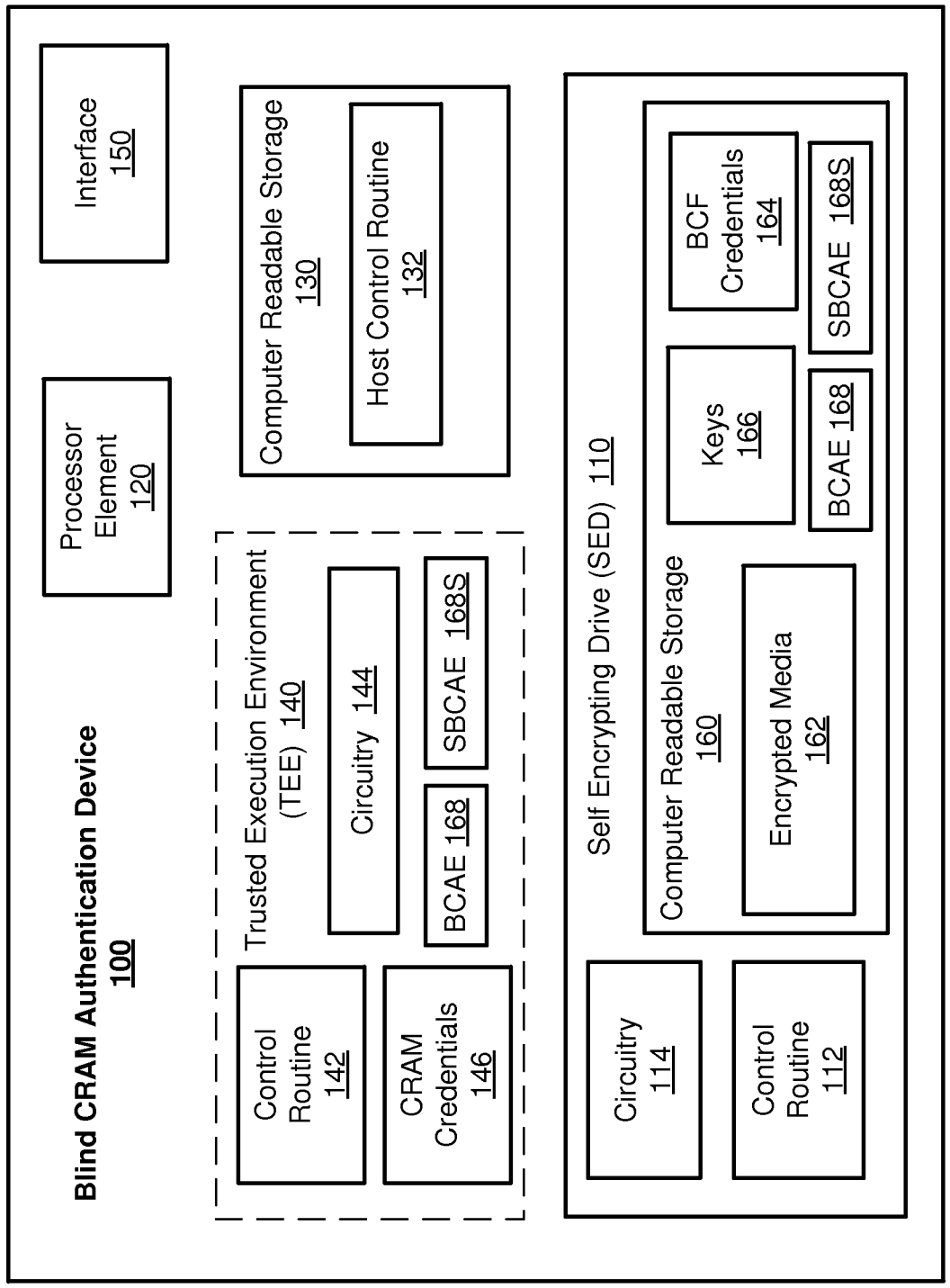
FIG. 1 illustrates a block diagram of a device according to an embodiment.

Various embodiments are directed to a system for accessing a self-encrypting drive (SED) based on a challenge response authentication mechanism (CRAM) and particularly a blind CRAM (BCRAM). In general, the present disclosure provides a system to unlock or access the contents of an SED where the unlock credentials (e.g., access keys) are not stored entirely within the SED or entirely within another part of the system (e.g., DRAM, or the like). Said differently, the present disclosure provides a system where an SED may be unlocked by collaborating with another part of the system. For example, from a high level, the present disclosure provides an SED configured to determine encryption/decryption credentials (e.g., a media encryption key (MEK), or the like) based on a challenge generated within the SED, cryptographically processed using a private key by a trusted execution environment (TEE) and cryptographically processed using a corresponding public key within the SED.

The present disclosure may be implemented to access or unlock an SED using a BCRAM upon resuming from a sleep (e.g., S3 power state) mode. For example, the SED may generate a blind challenge authentication element (BCAE). The BCAE is communicated to the TEE where it is signed, and the signed BCAE communicated to the SED. The SED may then use the signed BCAE to decrypt a MEK (or key ring includes at least one MEK) to unlock and/or decrypt the contents of the SED.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general computing device. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 depicts a block diagram of a device 100 for accessing an SED 110 using a BCRAM. More specifically, this figure depicts a device to authenticate the SED using a BCRAM. With various examples, the device 100 incorporates the SED 110 and one or more of a processor element 120, a computer-readable storage 130, a trusted execution environment (TEE) 140, and an interface 150. The SED 110 includes one or more of a control routine 112, circuitry 114, and computer-readable storage 160. The computer-readable storage 160 includes one or more of encrypted media 162, blind computation factor (BCF) credentials 164, and keys 166. The computer-readable storage 130 stores one or more of a host control routine 132. The TEE 140 includes one or more of a control routine 142, circuitry 144, and CRAM credentials 146.

Additionally, during operation, a blind challenge authentication element (BCAE) may be generated and signed, resulting in a signed BCAE (SBCAE). The BCAE and SBCAE are represented generally in FIG. 1 as BCAE 168 and SBCAE 168S. It is important to note, that the SED 110 may generate the BCAE 168 and the TEE 140 may generate the SBCAE 168S (e.g., by signing the BCAE 168, or the like). However, the BCAE 168 and SBCAE 168S are depicted within the computer readable storage 160, and the TEE 140. It is noted, that in practice, the BCAE 168 and the SBCAE 168S may be communicated between the SED 110 and the TEE 140 and not actually stored in storage.

The device 100 may be any of a variety of types of computing devices, including without limitation, a server, a desktop computer, a workstation computer, a laptop computer, a netbook computer, an ultrabook computer, a tablet computer, a handheld personal data assistant, a smartphone, a body-worn computing device (e.g., incorporated into clothing,) a media streaming device, an audio computing device, a video computing device, a smart television, or the like.

It is important to note, that the components of the device 100 may be implemented within the same housing and/or within separate housings. Furthermore, the device 100 may be implemented to operate in conjunction with an auxiliary device (e.g., refer to FIG. 8), for example, to utilize multi-factor authentication in unlocking the SED 110 using the BCRAM of the present disclosure.

In general, the host control routine 132 incorporates a sequence of instructions operative on the components of the device 100 (e.g., the processor element 120, or the like) to implement logic to unlock the SED 110. In executing the host control routine 132, the processor element 120 may initiate unlocking of the SED using a BCRAM as described herein. In particular, in executing the host control routine 132, the processor element 120 may communicate a request to unlock to the SED 110, the request to include an indication to generate a blind challenge authentication element (BCAE). With some example, in executing the host control routine 132, the processor element 120 may generate the request to unlock the SED 110 upon resuming from a low power state (e.g., S3 sleep state, or the like).

For example, the device 100 may be configured to implement various low power states, where portions of the device platform are powered off. As a specific example, the device 100 may be configured to implement a sleep state (e.g., S3) where the SED 110 is powered off. It is to be appreciated, in a typical S3 power state, memory components (e.g., dynamic random access memory (DRAM), or the like) are placed into a self refresh state, such that resuming from the low power state is faster than resuming from a cold boot (e.g., all components powered off). However, as the SED 110 is powered off, the encrypted media 162 may be inaccessible until it is decrypted and/or unlocked, described in greater detail below.

In executing the host control routine 132, the processor element 120 may also communicate the BCAE/SBCAE 168 between the SED 110 and the TEE 140. In various examples, the control routines 112 and 142 may incorporate a sequence of instructions operative on the circuitry 114 and 144, respectively, to implement logic to unlock the encrypted media 162.

For example, in executing the control routine 112, the circuitry 114 may generate the BCAE 168 based on the BCF credentials 164 and communicate the BCAE 168 to the TEE 140 (e.g., via the host control routine 132, or the like). Additionally, in executing the control routine 112, the circuitry 114 may access (described in greater detail below) the keys 166 based on the SBCAE 168S to decrypt the encrypted media 162. It is important to note, that keys 166 may include multiple keys (refer to FIGS. 2-3). For example, keys 166 may include a media encryption key (MEK) to decrypt the encrypted media 162. The MEK may be encrypted using a key encryption key (KEK). Furthermore, the KEK may be hidden or "wrapped." During operation the KEK can be unwrapped using the BCRAM detailed herein. Accordingly, the present disclosure provides that the KEK may be unwrapped to decrypt the MEK to decrypt the encrypted media 162. This is explained in greater detail below with reference to FIGS. 2-8.

Additionally, in executing the control routine 112, the circuitry 114 may be configured to provision or initialize the SED 110. More particularly, in executing the control routine 112, the circuitry 114 may generate the BCF credentials 164. Additionally, in executing the control routine 112, the circuitry 114 may generate the keys 166 (or a portion of the keys 166, such as, the KEK) based on the BCF credentials 164 and the CRAM credentials 146. More specifically, the present disclosure provides that the KEK may be generated and wrapped such that during operation, the wrapped KEK may be unwrapped using the BCRAM described herein to decrypt the MEK to decrypt the encrypted media 162.

In executing the control routine 142, the circuitry 144 may sign the BCAE 168, resulting in the SBCAE 168S. In particular, the circuitry 144 may sign the BCAE 168 based on the CRAM credentials 146. Additionally, the circuitry 144 may communicate the SBCAE 168S to the SED 110 (e.g., via the host control routine 132, or the like).

In various embodiments, the SED 110 may include any of a wide variety of hardware based disk encryption systems. For example, the SED 110 may be a hard disk drive, including without limitation, a hard disk drive implemented according to the OPAL and/or Enterprise standards promulgated by the Trusted Computing Group (TCG). For example, the SED 110 may be a hard drive implemented according to the OPAL Security Subsystem Class (SCC) 2.0 Specification, published by the TCG in 2012. With some examples, the SED 110 may be an enclosed hard disk drive implementing full-disk encryption, may be implemented using bridge and chipset full-disk encryption, or the like. Examples are not limited in this context.

In various embodiments, the processor element 120 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked. Furthermore, in various embodiments the processor element 120 may include a trusted execution environment (e.g., Intel CSE®, Intel ME®, Intel VT®, Intel SGX®, ARM Trusted-Zone®, or the like) to provide for the processing and/or storing of sensitive information. As a specific example, the processor element 120 may comprise the TEE 140.

In various embodiments, the storage 130 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the TEE 140 may comprise logic, functions, features, and/or storage to securely implement the functions described herein. It is important to note, as stated above, the TEE 140 may be incorporated into the processor element 120. However, for purposes of clarity, the TEE 140 is depicted separate from the processor element 120. In some examples, the TEE 140 may be implemented as a secure enclave, a secure co-processor, or the like.

Figure 9:
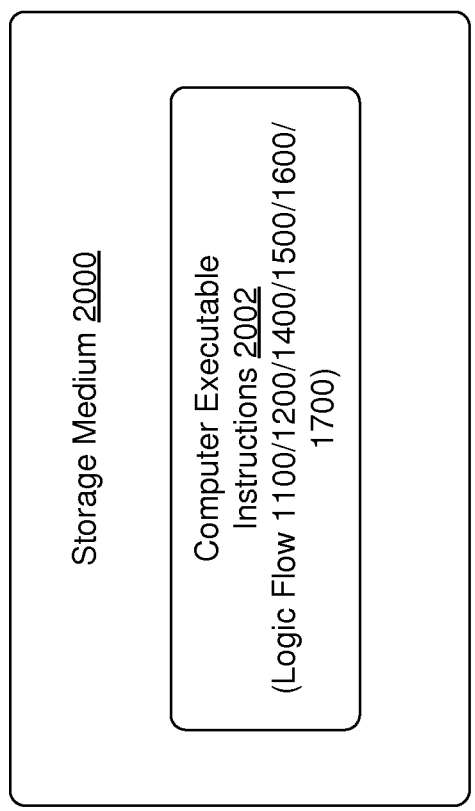
FIG. 9 illustrates an embodiment of computer-readable storage medium.

In various embodiments, the interface 150 may employ any of a wide variety of signaling technologies enabling the components to be coupled through a network (e.g., refer to FIG. 9). In particular, the device 100 may exchange signals (e.g., with another device, or the like) conveying information and/or data associated with decrypting the encrypted media 162.

Figure 2:
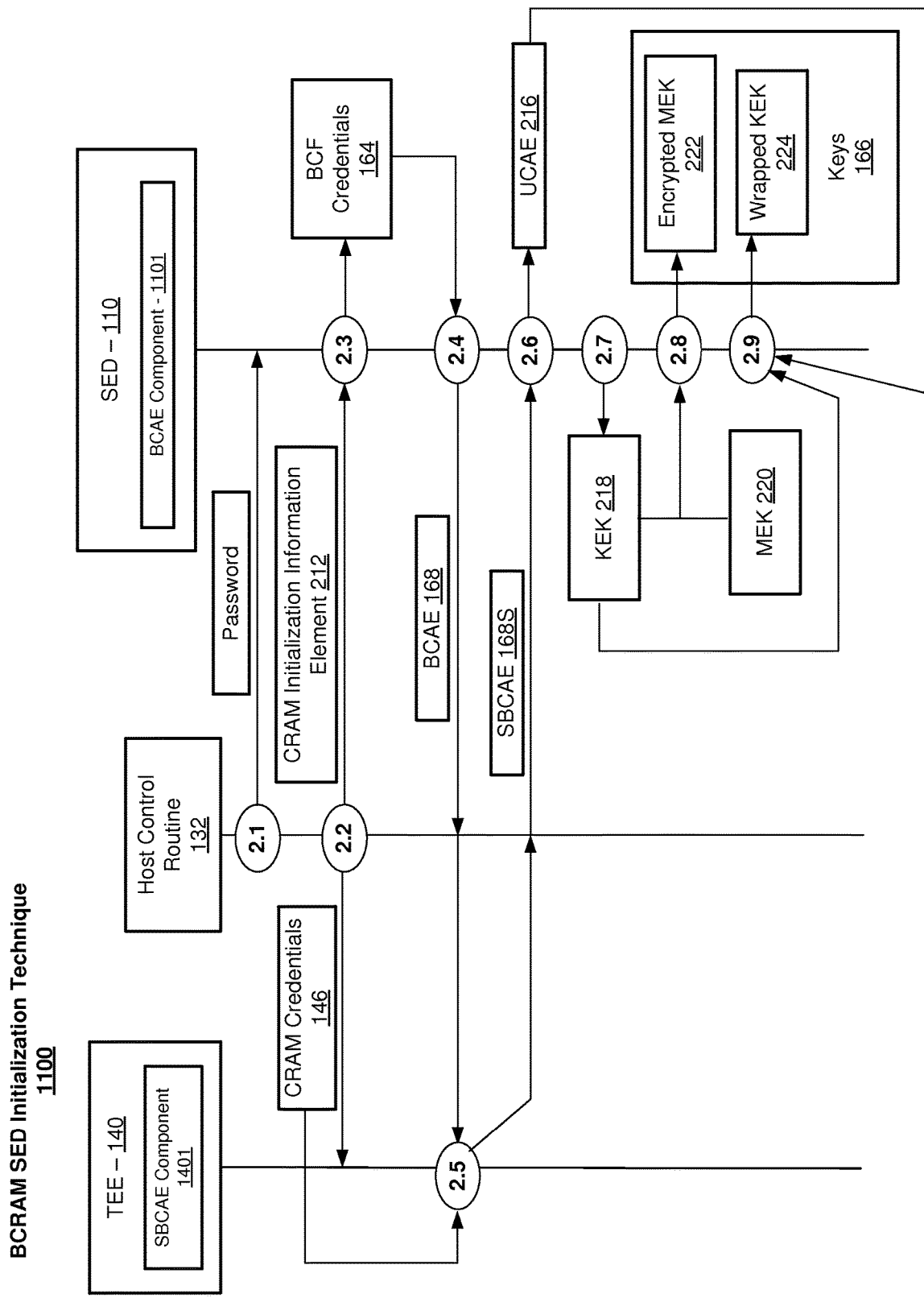
FIGS. 2-3 each illustrate a block diagram of aspects of the operation of the device of FIG. 1 according to an embodiment.
Figure 3:
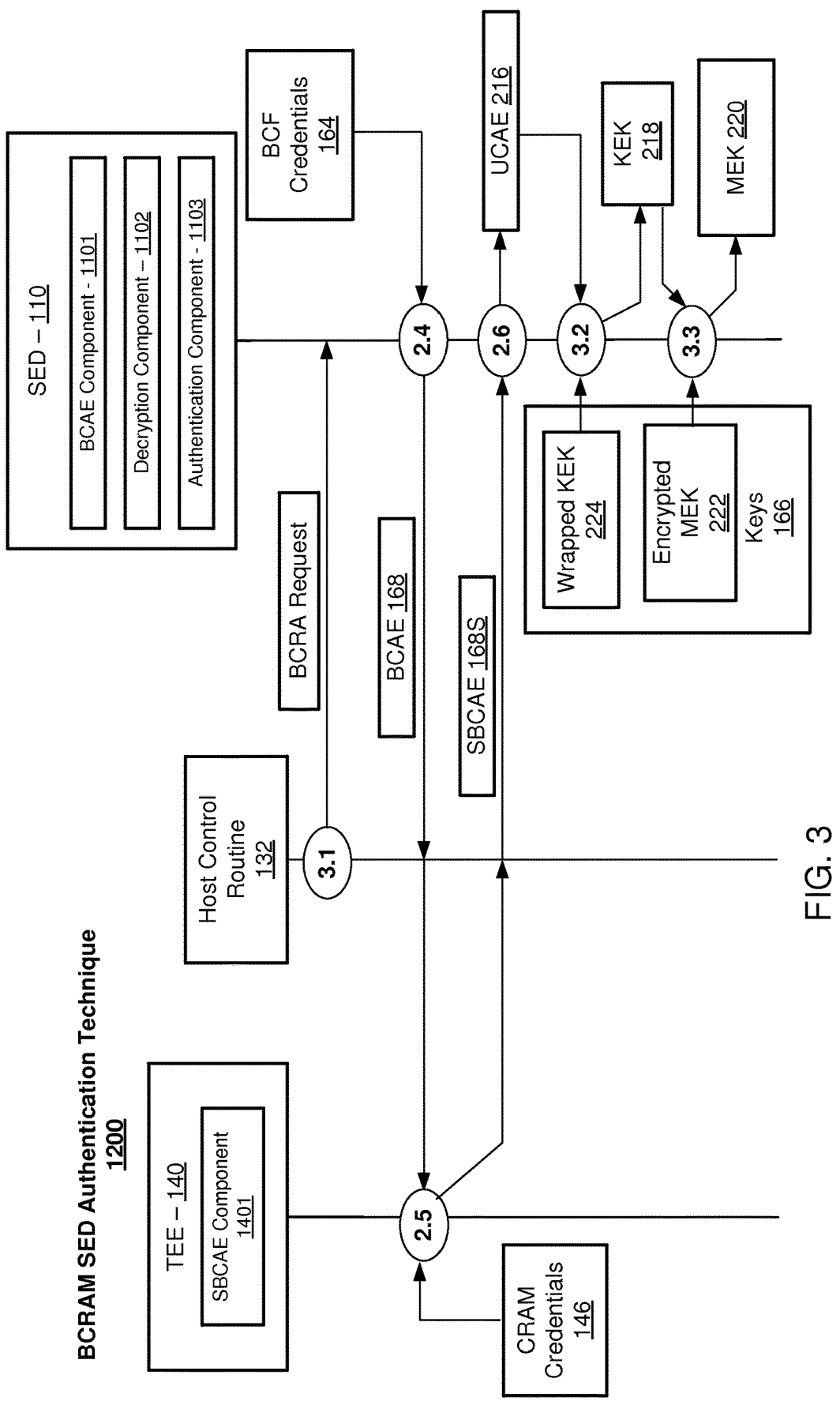

FIGS. 2-3 are block diagrams of techniques that may be implemented by the device 100. In particular, FIG. 2 illustrates a technique for initializing the SED 110 while FIG. 3 illustrates a technique for authenticating the SED 110 to access the encrypted media 162, for example, upon resuming from a low power state. FIGS. 2-3 are described with reference to the device 100 of FIG. 1. However, this is done for convenience and clarity and is not intended to be limiting. Furthermore, FIGS. 4-7 are block diagrams of logic flows for various aspects of the techniques depicted in FIGS. 2-3. The logic flows depicted in FIGS. 4-7 provide example implementations of the operations depicted in the techniques of FIGS. 2-3. As such, the description of FIGS. 2-3 is made with reference to FIGS. 4-7. However, this is also done for the purpose of clarity of presentation and not to be limiting.

Turning more specifically to FIG. 2, the technique 1100 is depicted. The technique 1100 may be implemented to initialize an SED for authentication using a BCRAM, as described herein. For example, the technique 1100 may be implemented to provision an SED such that the SED may be authenticated (e.g., unlocked, or the like) using the technique depicted in FIG. 3. More specifically, the technique 1100 may be implemented to provide an SED such that the SED can be autonomously unlocked, for example, upon resuming from a sleep state, or the like. The technique 1100 is depicted including a number of blocks 2.A, where A is a positive integer.

Beginning at block 2.1, the host control routine 132 may initially authenticate the SED 110. Said differently, the host control routine 132 may receive (e.g., from a user, or the like) an administrator password or access credentials for the SED 110 and may communicate the received password to the SED 110 to activate the SED 110. It is noted, that SEDs (e.g., the SED 110) typically are provisioned at the factory with an administrator password and one or more MEKs to enable the SED to be initially provisioned. As such, at block 2.1, the host control routine 132 may receive this administrator password to initially unlock the SED 110.

Continuing to block 2.2, the host control routine 132 may generate CRAM credentials. For example, the host control routine 132 may generate the CRAM credentials 146. In some examples, the computing element 120 (e.g., by executing the host control routine 132, or the like) may generate the CRAM credentials 146. With some examples, the host control routine 132 may communicate a CRAM initialization information element 212, to include an indication of at least some of the CRAM credentials 146 to the SED 110. Additionally, the host control routine 132 may communicate the CRAM credentials 146 to the TEE 140.

Figure 4:
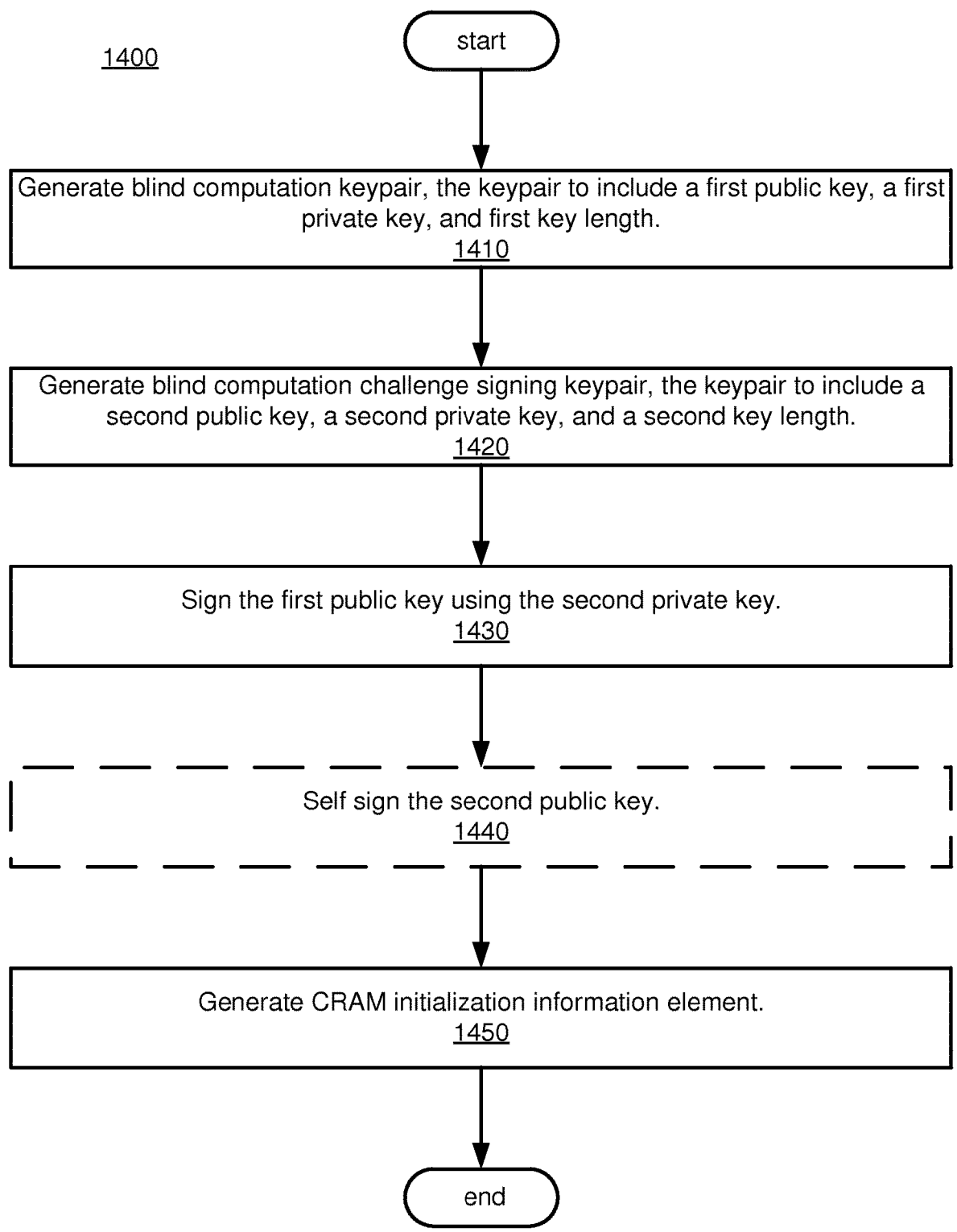
FIGS. 4-7 each illustrate logic flows according to various embodiments.

Turning more specifically to FIG. 4, a logic flow 1400 for generating CRAM credentials and a CRAM initialization information element is depicted. In some examples, the processor element 120, in executing the host control routine 132 may implement the logic flow 1400. More particularly, the processor element, in executing the host control routine 132 may implement the logic flow 1400 to generate the CRAM credentials 146 and the CRAM initialization information element 212.

The logic flow 1400 may begin at block 1410. At block 1410 "generate a blind computation keypair, the blind computation keypair to include a first public key, a first private key, and first key length," the processor element 120, in executing the host control routine 132, may generate a blind computation (BC) keypair to include a first public key ("BC_pub"), a first private key ("BC_priv"), and a first key length ("BC_n"). With some examples, the processor element 120 may generate the BC keypair based on a Rivest-Shamir-Adleman (RSA) public/private key scheme. With some examples, the BC keypair may be generated to have 2048 bits. Accordingly, a public and private key may be generated and a key length, corresponding to the keys, may be generated.

Continuing to block 1420 "generate a blind computation challenge signing keypair, the blind computation challenge signing keypair to include a second public key, a second private key, and second key length," the processor element 120, in executing the host control routine 132, may generate a blind computation challenge signing (BCS) keypair to include a second public key ("BCS_pub"), a second private key ("BCS_priv"), and a second key length ("BCS_n"). With some examples, the processor element 120 may generate the BCS keypair based on an RSA public/private key scheme. With some examples, the BCS keypair may be generated to have 2048 bits. Accordingly, a public and private key may be generated and a key length, corresponding to the keys, may be generated.

Continuing to block 1430 "sign the first public key using the second private key," the processor element 120, in executing the host control routine 132, may sign the first public key (BC_pub) using the second private key (BCS_priv).

Continuing to block 1440 "self sign the second public key," the processor element 120, in executing the host control routine 132, may self sign the second public key (BCS_pub). It is important to note, that block 1440 may be optional. Accordingly, in some examples, the logic flow 1400 may continue to block 1450 directly from block 1430.

Continuing to block 1450 "generate CRAM initialization information element," the processor element 120, in executing the host control routine 132, may generate the CRAM initialization information element 212. In some examples, the CRAM initialization information element may include an indication of the signed first public key (signed BC_pub), the second public key (BCS_pub), the first key length (BC_n), and the second key length (BCS_n). In some examples, the second public key may also be signed (e.g., if signed at block 1440, or the like).

Returning to FIG. 2, the technique 1100 may continue to block 2.3. At block 2.3, the SED 110 may generate the BCF credentials 164. For example, the circuitry 114, in executing the control routine 112, may generate the BCF credentials 164 based in part on the CRAM initialization information element 212. With some examples, the SED 110 may include (e.g., implemented in hardware, logic, or the like) a BCAE component 1101. The BCAE component 1101 may be configured to generate the BCF credentials 164 based on BC_pub, BCS_pub, BC_n, and BCS_n indicated in the CRAM initialization information element 212.

Figure 5:
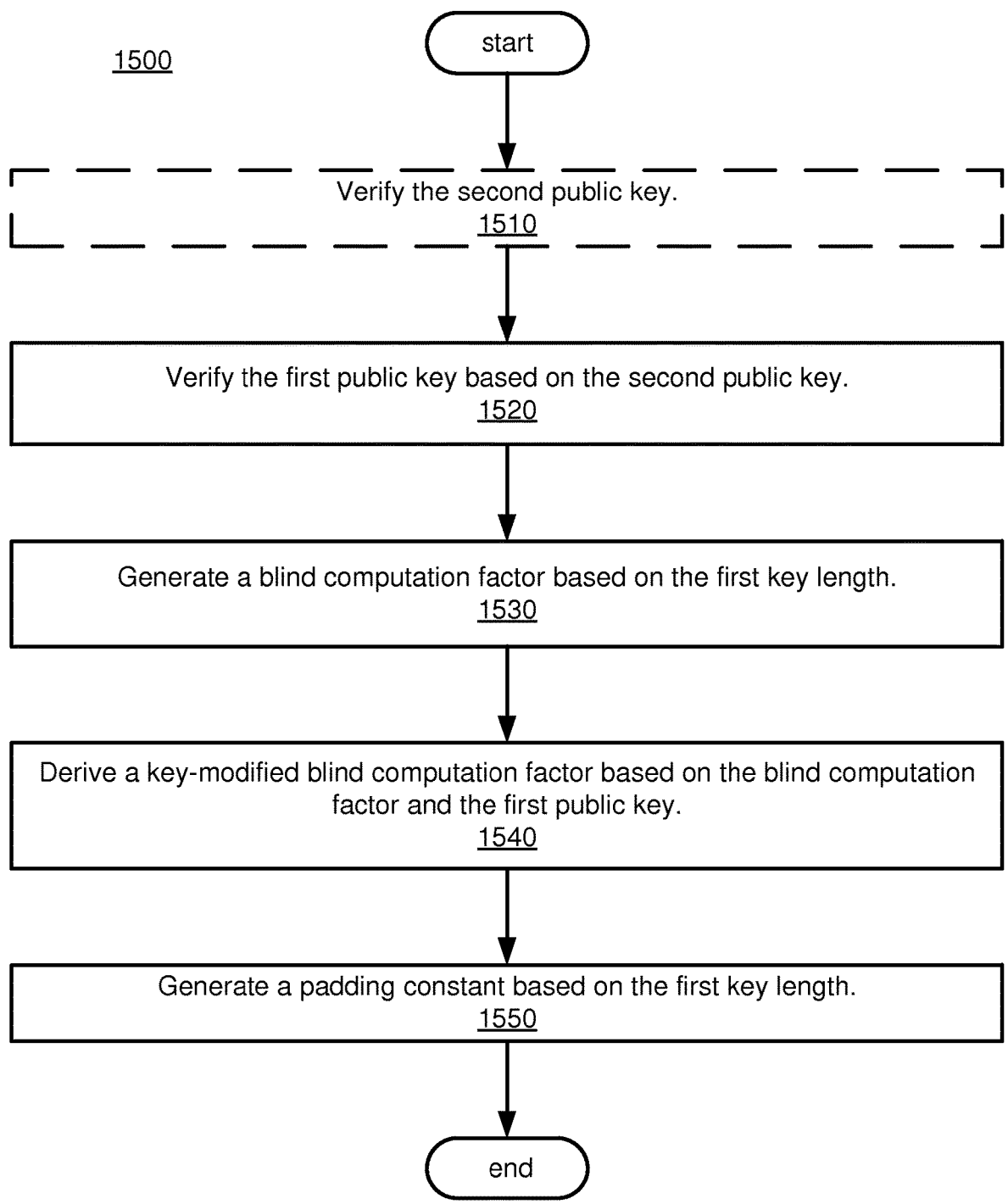

Turning more specifically to FIG. 5, a logic flow 1500 for generating BCF credentials is depicted. In some examples, the circuitry 114, in executing the control routine 112, may implement the logic flow 1500. More particularly, the circuitry 114 (e.g., in executing the control routine 112, in implementing the BCAE component 1101, or the like) may implement the logic flow 1500 to generate the BCF credentials 164.

The logic flow 1500 may begin at block 1510. At block 1510 "verify the second public key," the circuitry 114, in executing the control routine 112, may verify the second public key. For example the circuitry 114 may verify the second public key (BCS_pub) from the signed second public key. It is important to note, that block 1510 may be optional. More specifically, with some examples, BCS_pub is signed in the CRAM initialization information element 212. Accordingly, the circuitry 114 may verify BCS_pub and the logic flow 1500 may continue to block 1520. However, in some examples, BCS_pub is unsigned in the CRAM initialization information element 212. Accordingly, the logic flow 1500 may begin at block 1520.

At block 1520, "verify the first public key based on the second public key," the circuitry 114, in executing the control routine 112, may verify the first public key using the second public key. For example the circuitry 114 may verify the first public key (BC_pub) using the second public key (BCS_pub). As noted above, BC_pub may be signed using BCS_priv (e.g., at block 1430). Accordingly, signed BC_pub may be verified using BCS_pub.

Continuing to block 1530, "generate a blind computation factor based on the first key length," the circuitry 114, in executing the control routine 112, may generate a blind computation factor (BCF). With some examples, the circuitry 114 may generate the BCF from a random element contained within zero and the first key length minus 1. Said differently, BCF may be a random element, where 0<BCF<BC_n−1. In some examples, the random element may be a random number, a pseudo random number, or the like.

Continuing to block 1540, "derive a key modified blind computation factor based on the blind computation factor and the first public key," the circuitry 114, in executing the control routine 112, may determine a key modified blind computation factor ("BCF_key"). With some examples, the circuitry 114 may determine BCF_key from BCF, BC_pub, and BC_n. With some examples, the circuitry may derive BCF_key as BCF to the power of BC_pub modulo BC_n. Said differently, in some examples, BCF_key=BCF^BC_pub mod BC_n.

Continuing to block 1550, "generate a padding constant based the first key length," the circuitry 114, in executing the control routine 112, may generate a padding constant ("C_padding"). With some examples, the circuitry 114 may generate C_padding as a random element contained within zero and the first key length minus 1. Said differently, C_padding may be a random element, where $0<C\_padding<BC\_n-1$. In some examples, the random element may be a random number, a pseudo random number, or the like.

Returning to FIG. 2, the technique 1100 may continue to block 2.4. At block 2.4, the SED 110 may generate the BCAE 168. For example, the circuitry 114 (e.g., in executing the control routine 112, in implementing the BCASE component 1101, or the like) may generate the BCAE 168. Additionally, the SED 110 may communicate the BCAE 168 to the TEE 140 (e.g., via the host control routine 132, via a communication bus, via a secure channel, or the like).

Figure 6:
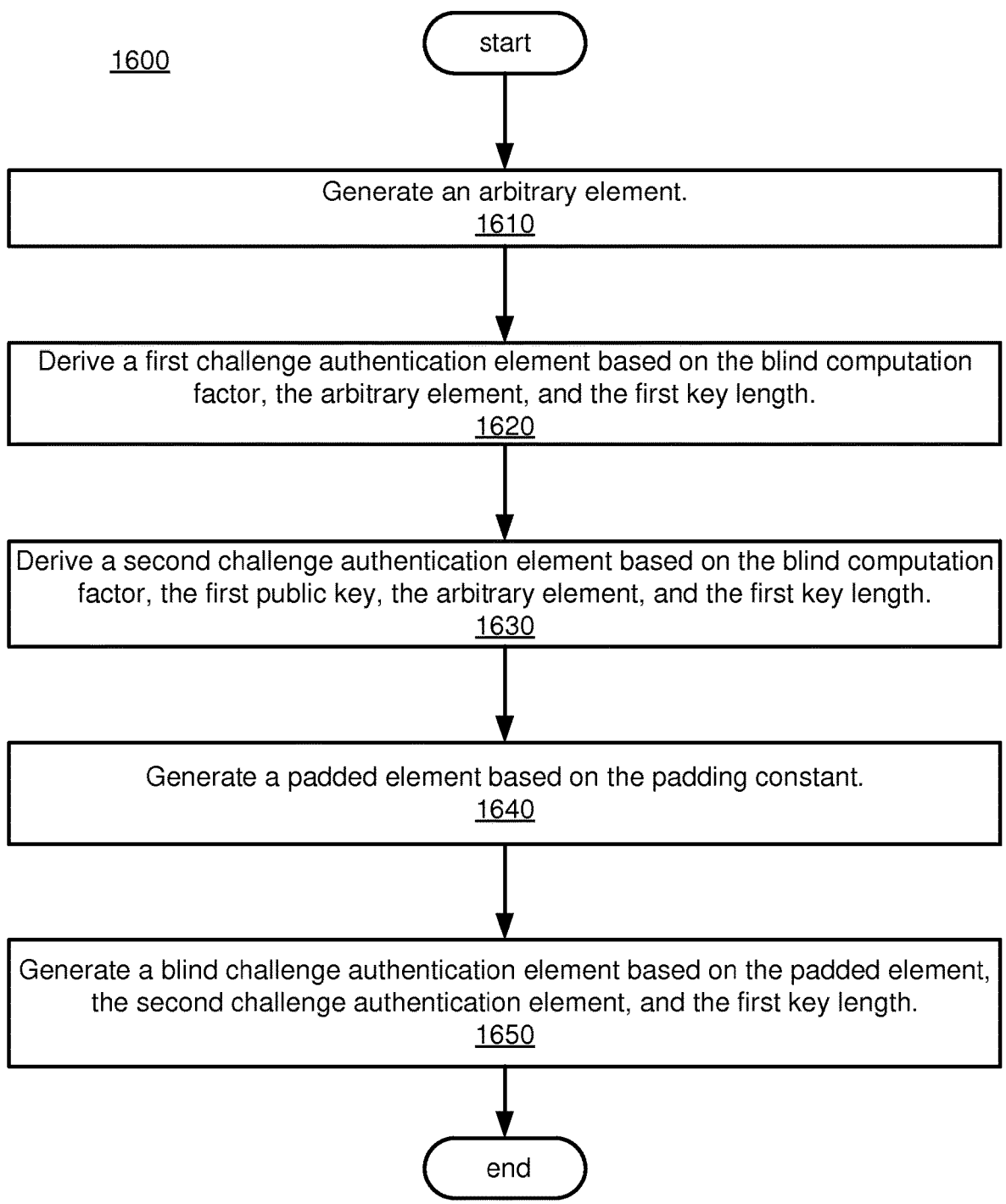

Turning more specifically to FIG. 6, a logic flow 1600 for generating a BCAE is depicted. In some examples, the circuitry 114 (e.g., in executing the control routine 112, in implementing the BCAE component 1101, or the like) may implement the logic flow 1600. More particularly, the circuitry 114, in executing the control routine 112, may implement the logic flow 1600 to generate the BCAE 168.

The logic flow 1600 may begin at block 1610. At block 1610 "generate nonce element," the circuitry 114, in executing the control routine 112, may generate an arbitrary (e.g., random, or the like) element ("Nonce"). In general, the nonce may be any arbitrary element. With some examples, Nonce may be a random number, a pseudo-random number, a random string, a pseudo-random string, a set of bits, a pseudo-random set of bits, or the like.

Continuing to block 1620 "derive a first challenge authentication element based on the blind computation factor, the arbitrary element, and the first key length," the circuitry, in executing the control routine 112, may generate a first challenge authentication element (CAE_first). In some examples, the circuitry 114 may derive CAE_first based on BCF, Nonce, and BC_n. In some example, the circuitry 114 may derive CAE_first as BCF to the power of Nonce modulo BC_n. Said differently, in some examples, $CAE\_first=BCF^{Nonce} \mod BC\_n$.

Continuing to block 1630 "derive a second challenge authentication element based on the blind computation factor, the arbitrary element, the first public key, and the first key length," the circuitry 114, in executing the control routine 112, may generate a second challenge authentication element (CAE_second). In some examples, the circuitry 114 may derive CAE_second based on BCF, Nonce, BC_pub, and BC_n. In some example, the circuitry 114 may derive CAE_second as BCF to the power of BC_pub to the power of Nonce modulo BC_n. Said differently, in some examples, $CAE\_second=(BCF^{BC\_pub})^{Nonce} \mod BC\_n$.

Continuing to block 1640 "generate a padded element based on the padding constant," the circuitry 114, in executing the control routine 112, may generate a padded element (P_hash) based on the padding constant. With some examples, the circuitry 114 may generate P_hash by hashing (e.g., using SHA-1, MD5, or the like) the padding constant (C_padding) and a unique identifier (UID), where UID corresponds to the encrypted media 164. It is noted the present disclosure may be implemented to enable multiple different encrypted volumes or partitions (e.g., refer to FIG. 8) to be unlocked autonomously. Each encrypted volume or partition may have a unique identifier (e.g., UID) assigned to it or corresponding to it. In some examples, the circuitry 114 may generate P_hash as P(C_padding II UID), where P is the hashing function (e.g., SHA-1, MD5, or the like).

Continuing to block 1650 "derive a blind challenge authentication element based on the second challenge authentication element, the padded element, and the first key length," the circuitry 114, in executing the control routine 112, may derive BCAE 168 based on CAE_second, P_hash, and BC_n. In some examples, the circuitry 114 may derive BCAE 168 as CAE_second multiplied by P_hash modulo BC_n. Said differently, in some examples, $BCAE=R*P$ (C_padding II UID) mod BC_n.

Returning to FIG. 2, in the technique 1100 at block 2.4, the SED 110 communicates BCAE 168 to the TEE 140. Continuing to block 2.5, the TEE 140 may generate SBCAE 168S. In some examples, the TEE may include (e.g., implemented in hardware, logic, or the like) a SBCAE component 1401. In some examples, the SBCAE component may be configured to generate the SBCAE 168S. More specifically, the circuitry 144 (e.g., in executing the control routine 142, in implementing the SBCAE component 1401, or the like) may generate SBCAE 168S based on BC_priv and BCS_priv. Additionally the TEE 140 may communicate SBCAE 168S to the SED 110 (e.g., via the host control routine 132, or the like).

With some examples, at block 2.5, the circuitry 144 may derive a key modified BCAE (BCAE_key) based on the BCAE, the first private key (BC_priv) and the first key length (BC_n). With some examples, the circuitry 114 may derive BCAE_key as BCAE to the power of BC_priv modulo BC_n. Said differently, with some examples, $BCAE\_key=BCAE^{BC\_priv} \mod BC\_n$. Additionally, at block 2.5, the circuitry 144 may derive SBCAE by signing BCAE_key with the second private key (BCS_priv).

Figure 7:
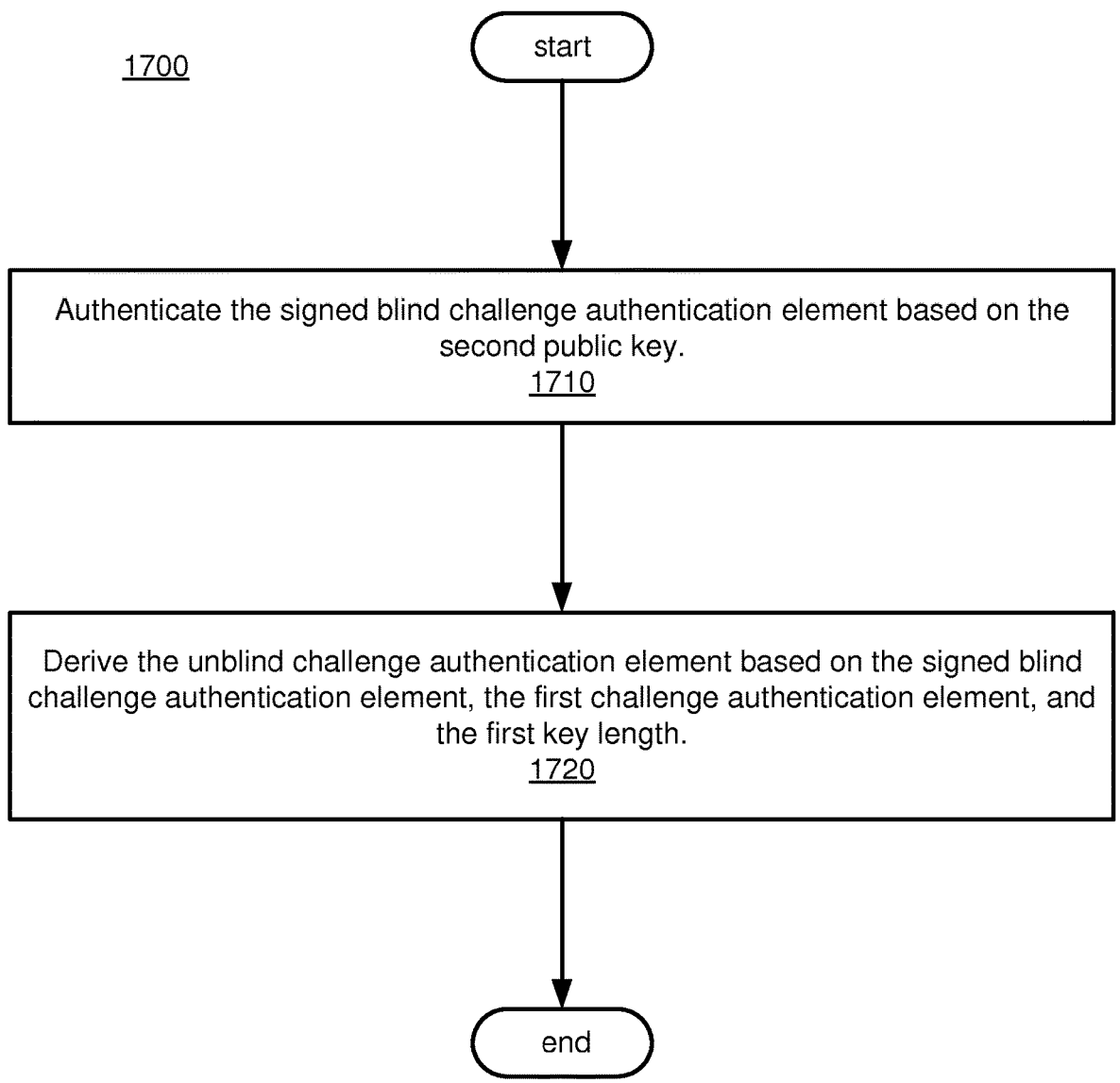

Continuing to block 2.6, the SED 110 may unblind the SBCAE 168S to derive the UCAE 216. For example, the circuitry 114 (e.g., in executing the control routine 112, in implementing the BCASE component 1101, or the like) may derive UCAE 216 from SBCAE 168S and the second public key (BCS_pub). Turning more specifically to FIG. 7, a logic flow 1700 to derive UCAE is depicted. In some examples, the circuitry 114, in executing the control routine 112, may implement the logic flow 1700. More specifically, the circuitry 114, in executing the control routine 112, may implement the logic flow 1700 to derive UCAE 216.

The logic flow 1700 may begin at block 1710. At block 1710 "authenticate the signed blind challenge authentication element based on the second public key," the circuitry 114, in executing the control routine 112, may authenticate SBCAE 168S based on BCS_pub.

Continuing to block 1720 "derive the unblind challenge authentication element based on the signed blind challenge authentication element, the first challenge authentication element, and the first key length," the circuitry 114, in executing the control routine 112, may derive UCAE based on SBCAE, CAE_first, and BC_n. With some examples, the circuitry 114 may derive UCAE as SBCAE multiplied by the inverse of CAE_first modulo BC_n. Said differently, in some examples, $UCAE=SBCAE*CAE\_first^{-1} \mod BC\_n$.

Returning to FIG. 2, the technique 1100 may continue to block 2.7. At block 2.7, the SED 110 may generate a key encryption key (KEK) 218. In general, the KEK 218 may be generated based on any of a variety of encryption key formats. Continuing to block 2.8, the SED 110 may encrypt the media encryption keys (MEK) 220 with the KEK 218. As noted above, the encrypted media 162 is encrypted with a media encryption key (e.g., MEK 220), which may be set at the factory and/or set by an administrator. Accordingly, at block 2.8, the circuitry 114 may encrypt the MEK 220 with the KEK 218, resulting in the encrypted MEK 222. It is important to note, that with some examples, the encrypted media 162 may be encrypted with multiple keys. For example, a first portion of the encrypted media 162 may be encrypted with a first MEK and a second portion of the encrypted media 162 may be encrypted with a second MEK.

The first and the second MEK may be stored in a key ring (not shown) to provide for the encryption/decryption of the encrypted media. The key ring may be encrypted with the KEK 218 as described herein to enable the autonomous authentication using BCRAM techniques described herein. As a specific example, a MEK may be used to encrypt/decrypt one or more logical block addresses (LBAs) of the SED 110. Accordingly, for each LBA within the encrypted media 162, a different MEK may be used. These MEKs may be stored in the key ring and encrypted with the KEK 218.

Continuing to block 2.9, the SED 110 may wrap the KEK 218. More particularly, the circuitry 114, in executing the control routine 112, may wrap the KEK 218 using the UCAE 216. In general, the circuitry 114 may wrap the KEK 218 based on the UCAE 216 using any of a variety of two-way obfuscation techniques. For example, the circuitry 114 may generate the wrapped KEK 224 based on a least significant bit (LSB) AES keywrap process. As depicted, the keys 166 include the encrypted MEK 222, wrapped KEK 224.

The BCF credentials 164 and the keys 166 may be stored in the SED 110 while the CRAM credentials 146 may be stored in the TEE 140. Accordingly, during operation, the SED 110 may be authenticated (e.g., upon resuming from a sleep state, or the like) without user interaction and without needing to permanently cache authentication credentials.

Turning more specifically to FIG. 3, the technique 1200 is depicted. The technique 1200 may be implemented to authenticate (e.g., unlocked, or the like) the SED 110. In particular, the technique 1200 may be implemented to autonomously unlock an SED, for example, upon resuming from a sleep state. The technique 1200 is depicted including ones of the blocks 2.A from FIG. 2 and blocks 3.A.

Beginning at block 3.1, the host control routine 132 may initially request to authenticate the SED 110 via the BCRAM detailed herein. In particular, the host control routine 132 may communicate a blind challenge response authentication (BCRA) request to include an indication to generate a BCAE. The BCRA request may be communicated to the SED 110.

The SED 110, based on receiving the BCRA request, may initiate the BCRAM detailed herein. In particular, the SED may generate the BCAE 168. As such, the technique 1200 may continue from block 3.1 to block 2.4. More specifically, the SED 110 may recover the BCF credentials 164 (e.g., BCF, BCF_key, BC_n, BCS_n, and C_padding) and generate the BCAE 168 based on the BCF credentials 164. As described above, with some examples, the circuitry 114 (e.g., in executing the control routine 112, in implementing the BCASE component 1101, or the like), at block 2.4, may implement the logic flow 1600 depicted in FIG. 6. Additionally, at block 2.4, the SED 110 may communicate BCAE 168 to the TEE 140 (e.g., via the host control routine 132).

The technique 1200 may continue to block 2.5. More specifically, the TEE 140 may receive the BCAE 168 and generate the SBCAE 168S based on the CRAM credentials 146. Additionally, at block 2.5, the TEE 140 may communicate the SBCAE 168S to the SED 110 (e.g., via the host control routine 132). The technique 1200 may continue to block 2.6. More specifically, the SED 110 may generate the UCAE 216 based on the SBCAE and the BCF credentials 146.

Continuing to block 3.2, the SED 110 may unwrap the wrapped KEK 224 based on the UCAE 216. More particularly, the circuitry 114, in executing the control routine 112, may unwrap the wrapped KEK 224 using the UCAE 216. In general, the circuitry 114 may unwrap the KEK 218 based on the UCAE 216 using the two-way obfuscation technique used to wrap the KEK 218 (e.g., at block 2.9 of the technique 1100 depicted in FIG. 2). For example, the circuitry 114 may unwrap (e.g., validate) the wrapped KEK 224 based on a least significant bit (LSB) AES keywrap process to determine the KEK 218.

Continuing to block 3.3, the SED 110 may decrypt the encrypted MEK 222 using the KEK 218. More particularly, the circuitry 114, in executing the control routine 112, may decrypt the encrypted MEK 222 using the KEK 218. It is noted, that once the MEK 220 is decrypted, the SED 110 may be unlocked. More specifically, the encrypted media 162 may be decrypted and/or accessed using the MEK 220. For example, the SED may include a decryption component 1102 (e.g., implemented in hardware, logic, or the like) to decrypt at least a portion of the SED with the MEK 220.

Furthermore, the SED 110 may include an authentication component 1103 (e.g., implemented in hardware, logic, or the like) to determine whether the KEK 218 is valid to determine the MEK 220. Based on the determination that the KEK 218 is invalid, the authentication element 1103 may be configured to communicate a request for valid authentication credentials (e.g., KEK 218) from the host.

Figure 8:
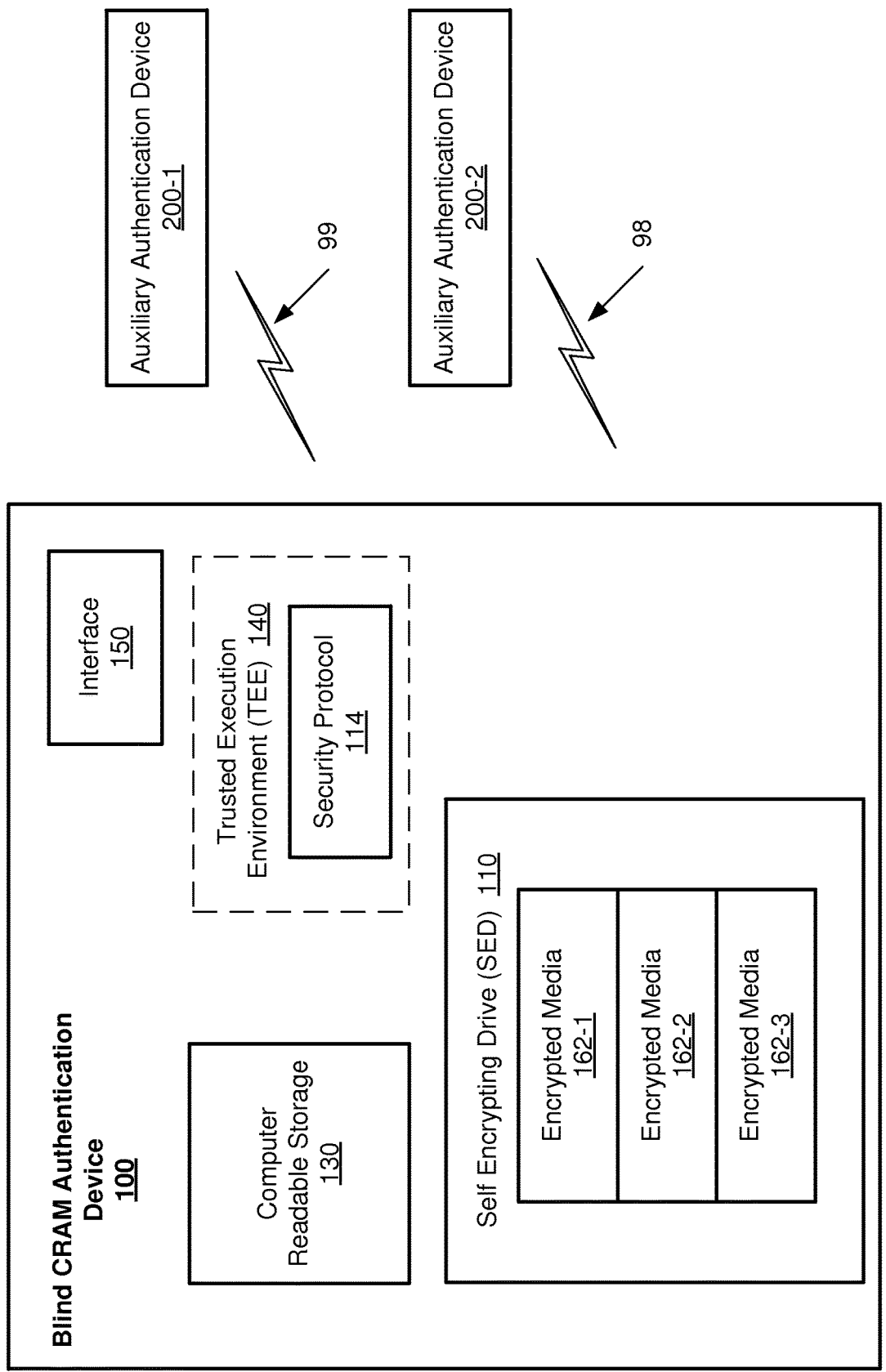
FIG. 8 illustrates a system according to an embodiment.

FIG. 8 illustrates an example system 1000 including the device 100 and one or more auxiliary authentication devices 200-*a*, where a is a positive integer. It is important to note, that this figure illustrates auxiliary authentication devices 200-1 and 200-2. However, more or less auxiliary authentication devices 200-*a* may be implemented. In general, the device 100 may be configured to authenticate the SED 110 (e.g., upon resuming from a sleep state, or the like) based on a multi-factor security protocol.

In various examples, the system 1000 may include the device 100 as described above in conjunction with FIG. 1. It is noted, that portions of the device 100 described above are not shown in FIG. 8 for clarity. Furthermore, as depicted in FIG. 8, the device 100 may include additional components. For example, the TEE 140 may include a security protocol 180. Furthermore, in some examples, the SED 110 may include multiple partitions or volumes of encrypted media 161-*b*, where b is a positive integer. For example, the SED 110 is depicted including encrypted media 162-1, 162-2, and 162-3. The encrypted media volumes 162-*b* may provide multiple encrypted storage volumes for different uses and/or security profiles. For example, the encrypted media 162-1 may correspond to a boot volume, the encrypted media 162-2 may correspond to user data, and the encrypted media 162-3 may correspond to company and/or confidential data.

Furthermore, the auxiliary authentication devices 200-1 and 200-2 are depicted connected to the device 100 via connection 98 and 99. It is noted, that the connections 98 and 99 may be any of a variety of connection mechanisms, such as, for example, Wi-Fi, NFC, RFID, Bluetooth, ZigBee, or the like. Additionally, although the auxiliary authentication devices 200-1 and 200-2 are depicted separate from the device 100, one or more of the devices 200-*a* may be incorporated into the device. Furthermore, although the auxiliary authentication devices 200-1 and 200-2 are depicted wirelessly connected to the device 100, one or more of the devices 200-*a* may be connected via a wired connection.

In general, the auxiliary authentication devices 200-*a* may be any of a variety of different devise configured to authenticate a user and/or authenticate based on proximity. For example, the auxiliary authentication devices may comprise a camera, a biometric scanning or biometric imaging device (e.g., fingerprint, retina, voice, or the like), a network, or a corporate badge. The system 1000 may be configured to unlock one or more portions of the SED 110 based on the security protocol 180 and/or the auxiliary authentication devices 200-*a*. For example, the security protocol 180 may specify that access to the CRAM credentials 146 (and therefore, the ability to complete the BCRAM described herein) may be restricted based on connection to one or more of the auxiliary authentication devices 200-1 and/or 200-2.

During operation, access to the CRAM credentials 146 within the TEE 140 may be restricted based on the security protocol 180. For example, the security protocol 180 may specify that one or more authentication factors must be validated to allow access to the CRAM credentials 146. Accordingly, during operation, the TEE 140 may generate the SBCAE 168S based on receiving the BCAE 168 and validating the one or more authentications factors specified in the security protocol 180. For example, the security protocol 180 may specify that the auxiliary device 200-1 capture a picture of a user and the picture validated as an user (e.g., using facial recognition, or the like) to enable use of the CRAM credentials 146. Additionally, the security protocol 180 may specify that the auxiliary device 200-2 capture a wireless beacon the wireless beacon is validated as an authorized beacon (e.g., corresponding to an RFID beacon emitted by an employee badge, or the like) to enable use of the CRAM credentials 146. In some examples, the security protocol 180 may specify that multiple authentication factors (e.g., facial recognition and RFID validation, or the like) be validated to allow access to the CRAM credentials 146.

With some embodiments, the MEKs to access the encrypted media volumes 162-1, 162-2, and 162-3 may be encrypted with KEKs that are wrapped using the BCRAM technique described herein. For example, the MEKs used to encrypt/decrypt the encrypted media volumes 162-1, 162-2, and 162-3 may be accessible using the technique 1200 depicted in FIG. 3. With some examples, each of the MEKs used to encrypt/decrypt the encrypted media volumes 162-1, 162-2, and 162-3 may be accessible using a different set of CRAM credentials 146 and BCF credentials 164. More specifically, the technique 1100 depicted in FIG. 2 may be implemented for each of the encrypted media volumes to generate separate CRAM credentials 146 and BCF credentials 164 for each encrypted media volume.

FIG. 9 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 1100. In some examples, the storage medium 2000 may store various types of computer executable instructions to implement technique 1200. In some examples, the storage medium 2000 may store various types of computer executable instructions to implement logic flow 1400. In some examples, the storage medium 2000 may store various types of computer executable instructions to implement logic flow 1500. In some examples, the storage medium 2000 may store various types of computer executable instructions to implement logic flow 1600. In some examples, the storage medium 2000 may store various types of computer executable instructions to implement logic flow 1700.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
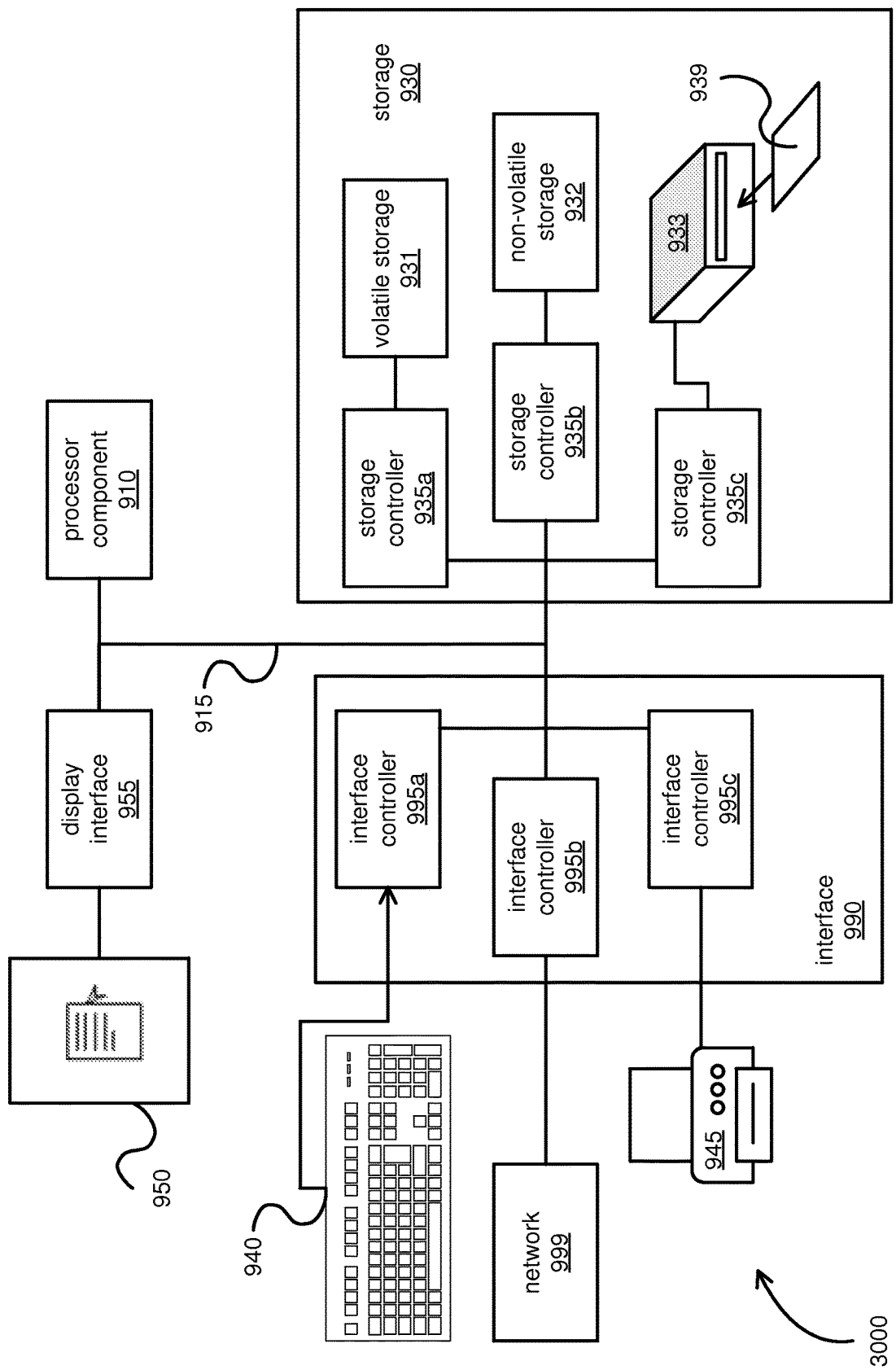
FIG. 10 illustrates an embodiment of a processing architecture.

FIG. 10 illustrates an embodiment of an exemplary processing architecture 3000 suitable for implementing various embodiments as previously described. More specifically, the processing architecture 3000 (or variants thereof) may be implemented as part of the system 1000 of FIG. 8 and/or the device 100 of FIGS. 1-3.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3000, a computing device incorporates at least a processor element 910, a storage 930, an interface 990 to other devices, and coupling 915. Depending on various aspects of a computing device implementing the processing architecture 3000, including its intended use and/or conditions of use, such a computing device may further incorporate additional components, such as without limitation, a counter element 915.

The coupling 915 incorporates one or more buses, point-to-point interconnects, transceivers, buffers, crosspoint switches, and/or other conductors and/or logic that communicatively couples at least the processor element 910 to the storage 930. The coupling 915 may further couple the processor element 910 to one or more of the interface 990 and the display interface 955 (depending on which of these and/or other components are also present). With the processor element 910 being so coupled by couplings 915, the processor element 910 is able to perform the various ones of the tasks described at length, above, for whichever ones of the computing devices 100, 300 and 600 implement the processing architecture 3000. The coupling 915 may be implemented with any of a variety of technologies or combinations of technologies by which signals are optically and/or electrically conveyed. Further, at least portions of couplings 915 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, Serial ATA (SATA) and the like.

As previously discussed, the processor element 910 may include any of a wide variety of commercially available processors, employing any of a wide variety of technologies and implemented with one or more cores physically combined in any of a number of ways.

As previously discussed, the storage 930 may include one or more distinct storage devices based on any of a wide variety of technologies or combinations of technologies. More specifically, as depicted, the storage 930 may include one or more of a volatile storage 931 (e.g., solid state storage based on one or more forms of RAM technology), a non-volatile storage 932 (e.g., solid state, ferromagnetic, phase change, or other storage not requiring a constant provision of electric power to preserve their contents), and a removable media storage 933 (e.g., removable disc or solid state memory card storage by which information may be conveyed between computing devices). This depiction of the storage 930 as possibly comprising multiple distinct types of storage is in recognition of the commonplace use of more than one type of storage device in computing devices in which one type provides relatively rapid reading and writing capabilities enabling more rapid manipulation of data by the processor element 910 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 931 is present and is based on RAM technology, the volatile storage 931 may be communicatively coupled to coupling 915 through a storage controller 935a providing an appropriate interface to the volatile storage 931 that perhaps employs row and column addressing, and where the storage controller 935a may perform row refreshing and/or other maintenance tasks to aid in preserving information stored within the volatile storage 931. By way of another example, where the non-volatile storage 932 is present and includes one or more ferromagnetic and/or solid-state disk drives, the non-volatile storage 932 may be communicatively coupled to coupling 915 through a storage controller 935b providing an appropriate interface to the non-volatile storage 932 that perhaps employs addressing of blocks of information and/or of cylinders and sectors. By way of still another example, where the removable media storage 933 is present and includes one or more optical and/or solid-state disk drives employing one or more pieces of removable machine-readable storage media 939, the removable media storage 933 may be communicatively coupled to coupling 915 through a storage controller 935c providing an appropriate interface to the removable media storage 933 that perhaps employs addressing of blocks of information, and where the storage controller 935c may coordinate read, erase and write operations in a manner specific to extending the lifespan of the machine-readable storage media 939.

One or the other of the volatile storage 931 or the non-volatile storage 932 may include an article of manufacture in the form of a machine-readable storage media on which a routine comprising a sequence of instructions executable by the processor element 910 may be stored, depending on the technologies on which each is based. By way of example, where the non-volatile storage 932 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 932 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 910 may initially be stored on the machine-readable storage media 939, and the removable media storage 933 may be subsequently employed in copying that routine to the non-volatile storage 932 for longer term storage not requiring the continuing presence of the machine-readable storage media 939 and/or the volatile storage 931 to enable more rapid access by the processor element 910 as that routine is executed.

As previously discussed, the interface 990 may employ any of a variety of signaling technologies corresponding to any of a variety of communications technologies that may be employed to communicatively couple a computing device to one or more other devices. Again, one or both of various forms of wired or wireless signaling may be employed to enable the processor element 910 to interact with input/output devices (e.g., the depicted example keyboard 940 or printer 945) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 940. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 945. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 950), such a computing device implementing the processing architecture 3000 may also incorporate the display interface 955. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 955 in a communicative coupling of the display 950 may make use of signaling and/or protocols that conform to any of a variety of industry standards, including without limitation, any of a variety of analog video interfaces, Digital Video Interface (DVI), DisplayPort, etc.

More generally, the various elements of the computing devices 100, 200, and 400 may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The disclosure now to providing example implementations.

Example 1

An apparatus, comprising: logic, a portion of which is implemented in hardware, the logic to comprise a blind challenge authentication element (BCAE) component to: generate a BCAE; receive a signed blind challenge authentication element (SBCAE) from a signing entity; and determine authentication credentials to access a self encrypting drive based at least in part on the SBCAE; and a communications bus communicatively coupled to the logic, the communications bus to communicate the BCAE and SBCAE.

Example 2

The apparatus of example 1, the BCAE component to execute in the SED.

Example 3

The apparatus of example 1, the BCAE component to: receive a BCRAM request, the BCRAM request to include an indication to authenticate the self encrypting drive; and generate the BCAE in response to receiving the BCRAM request.

Example 4

The apparatus of example 3, the BCAE component to: generate an arbitrary element; determine a CAE based at least in part on the arbitrary element and a public key, the public key corresponding to a private key from a public/private key pair; and determine the BCAE based at least in part on the CAE.

Example 5

The apparatus of example 4, the BCAE component to: determine a padded challenge authentication element (PCAE) based at least in part on the CAE and a padding constant, the padding constant determined based at least in part on a length of the public key; and determine the BCAE based at least in part on the PCAE and the CAE.

Example 6

The apparatus of example 5, the CAE a first CAE, the BCAE component to: determine an unblind challenge authentication element (UCAE) based on the SBCAE, a second CAE, and the length of the public key, the second CAE based at least in part on the arbitrary element and the length of the public key; and determine the authentication credentials based at least in part on the UCAE.

Example 7

The apparatus of example 1, comprising a decryption component, the decryption component to decrypt a least a portion of the SED based on the authentication credentials.

Example 8

The apparatus of example 1, comprising an authentication component, the authentication component to: determine whether the authentication credentials are valid; and communicate a request for valid authentication credentials to a host based on the determination that the authentication credentials are not valid.

Example 9

The apparatus of example 1, the authentication credentials to include media access keys.

Example 10

The apparatus of example 9, the media access keys to decrypt less than all of the SED.

Example 11

An apparatus, comprising: a trusted execution environment (TEE); a signed blind challenge authentication element SBCAE component executable by the TEE, the SBCAE component to: receive a blind challenge authentication element (BCAE) from a self encrypting drive (SED), the BCAE based in part on a public key, the public key corresponding to a private key from a public/private key pair; and derive a SBCAE based on the private key and a length of the public key; and a communication bus to communicate the BCAE and the SBCAE.

Example 12

The apparatus of example 11, the TEE comprising a secure processor element and a secure computer readable storage.

Example 13

The apparatus of example 11, the SBCAE component to: receive at least one authentication factor; determine whether the at least one authentication factor is valid; and derive the SBCAE based on the determination that the at least one authentication factor is valid.

Example 14

The apparatus of example 11, the SBCAE component to: receive a first authentication factor; receive a second authentication factor; determine whether the first authentication factor is valid; determine whether the second authentication factor is valid; and derive the SBCAE based on the determination that the first authentication factor and the second authentication factor are valid.

Example 15

The apparatus of example 11, the SBCAE component to: generate the public/private key pair; communicate the public key and a length of the public key to the SED; and communicate a request to initialize the SED for authentication using a blind challenge response authentication mechanism (BCRAM).

Example 16

An apparatus, comprising: a processor element; logic executable by the processor element, the logic to: generate a blind challenge authentication element (BCAE); communicate the BCAE to a signing entity; receive a signed blind challenge authentication element (SBCAE) from the signing entity; and determine authentication credentials to access a self encrypting drive based at least in part on the SBCAE.

Example 17

The apparatus of example 16, the logic to: receive a BCRAM request, the BCRAM request to include an indication to authenticate the self encrypting drive; and generate the BCAE in response to receiving the BCRAM request.

Example 18

The apparatus of example 17, the logic to: generate an arbitrary element; determine a CAE based at least in part on the arbitrary element and a public key, the public key corresponding to a private key from a public/private key pair; and determine the BCAE based at least in part on the CAE.

Example 19

The apparatus of example 18, the logic to: determine a padded challenge authentication element (PCAE) based at least in part on the CAE and a padding constant, the padding constant determined based at least in part on a length of the public key; and determine the BCAE based at least in part on the PCAE and the CAE.

Example 20

The apparatus of example 19, the CAE a first CAE, logic to: determine an unblind challenge authentication element (UCAE) based on the SBCAE a second CAE and the length of the public key, the second CAE based at least in part on the arbitrary element and the length of the public key; and determine the authentication credentials based at least in part on the UCAE.

Example 21

The apparatus of example 16, the logic to decrypt the self encrypting drive based on the authentication credentials.

Example 22

The apparatus of example 16, the logic to: determine whether the authentication credentials are valid; and communicate a request for valid authentication credentials to a host based on the determination that the authentication credentials are not valid.

Example 23

The apparatus of example 16, the authentication credentials to include media access keys.

Example 24

The apparatus of example 23, the media access keys to decrypt less than all of the self encrypted drive.

Example 25

An apparatus, comprising: a trusted execution environment; logic executable by the trusted execution environment, the logic to: receive a blind challenge authentication element (BCAE) from a self encrypting drive, the BCAE based in part on a public key, the public key corresponding to a private key from a public/private key pair; derive a signed blind challenge authentication element (SBCAE) based on the private key and a length of the public key; and communicate the SBCAE to the self encrypting drive.

Example 26

The apparatus of example 25, the trusted execution environment comprising a secure processor element and a secure computer readable storage.

Example 27

The apparatus of example 25, the logic to: receive at least one authentication factor; determine whether the at least one authentication factor is valid; and derive the SBCAE based on the determination that the at least one authentication factor is valid.

Example 28

The apparatus of example 25, the logic to: receive a first authentication factor; receive a second authentication factor; determine whether the first authentication factor is valid; determine whether the second authentication factor is valid; and derive the SBCAE based on the determination that the first authentication factor and the second authentication factor are valid.

Example 29

The apparatus of example 25, the logic to: generate the public/private key pair; communicate the public key and a length of the public key to the self encrypting drive; and communicate a request to initialize the self encrypting drive for authentication using a blind challenge authentication mechanism.

Example 30

At least one machine-readable storage medium comprising instructions that when executed by a self encrypting drive, cause the self encrypting drive to: generate a blind challenge authentication element (BCAE); communicate the BCAE to a signing entity; receive a signed blind challenge authentication element (SBCAE) from the signing entity; and determine authentication credentials to access a self encrypting drive based at least in part on the SBCAE.

Example 31

The at least one machine-readable storage medium of example 30, comprising instructions that further cause the self encrypting drive to: receive a BCRAM request, the BCRAM request to include an indication to authenticate the self encrypting drive; and generate the BCAE in response to receiving the BCRAM request.

Example 32

The at least one machine-readable storage medium of example 31, comprising instructions that further cause the self encrypting drive to: generate an arbitrary element; determine a CAE based at least in part on the arbitrary element and a public key, the public key corresponding to a private key from a public/private key pair; and determine the BCAE based at least in part on the CAE.

Example 33

The at least one machine-readable storage medium of example 32, comprising instructions that further cause the self encrypting drive to: determine a padded challenge authentication element (PCAE) based at least in part on the CAE and a padding constant, the padding constant determined based at least in part on a length of the public key; and determine the BCAE based at least in part on the PCAE and the CAE.

Example 34

The at least one machine-readable storage medium of example 33, the CAE a first CAE, the at least one machine-readable storage medium comprising instructions that further cause the self encrypting drive to: determine an unblind challenge authentication element (UCAE) based on the SBCAE a second CAE and the length of the public key, the second CAE based at least in part on the arbitrary element and the length of the public key; and determine the authentication credentials based at least in part on the UCAE.

Example 35

The at least one machine-readable storage medium of example 34, comprising instructions that further cause the self encrypting drive to decrypt the self encrypting drive based on the authentication credentials.

Example 36

The at least one machine-readable storage medium of example 30, comprising instructions that further cause the self encrypting drive to: determine whether the authentication credentials are valid; and communicate a request for valid authentication credentials to a host based on the determination that the authentication credentials are not valid.

Example 37

The at least one machine-readable storage medium of example 36, the authentication credentials to include media access keys.

Example 38

The at least one machine-readable storage medium of example 37, the media access keys to decrypt less than all of the self encrypted drive.

Example 39

At least one machine-readable storage medium comprising instructions that when executed by a trusted execution environment (TEE), cause the TEE to: receive a blind challenge authentication element (BCAE) from a self encrypting drive, the BCAE based in part on a public key, the public key corresponding to a private key from a public/private key pair; derive a signed blind challenge authentication element (SBCAE) based on the private key and a length of the public key; and communicate the SBCAE to the self encrypting drive.

Example 40

The at least one machine-readable storage medium of example 39, the TEE comprising a secure processor element and a secure computer readable storage.

Example 41

The at least one machine-readable storage medium of example 39, comprising instructions that further cause the TEE to: receive at least one authentication factor; determine whether the at least one authentication factor is valid; and derive the SBCAE based on the determination that the at least one authentication factor is valid.

Example 42

The at least one machine-readable storage medium of example 39, comprising instructions that further cause the TEE to: receive a first authentication factor; receive a second authentication factor; determine whether the first authentication factor is valid; determine whether the second authentication factor is valid; and derive the SBCAE based on the determination that the first authentication factor and the second authentication factor are valid.

Example 43

The at least one machine-readable storage medium of example 39, comprising instructions that further cause the TEE to: generate the public/private key pair; communicate the public key and a length of the public key to the self encrypting drive; and communicate a request to initialize the self encrypting drive for authentication using a blind challenge authentication mechanism.

Example 44

A computer-implemented method comprising: generating, on a processor element of a self encrypting drive, a blind challenge authentication element (BCAE); communicating the BCAE to a signing entity; receiving a signed blind challenge authentication element (SBCAE) from the signing entity; and determining authentication credentials to access a self encrypting drive based at least in part on the SBCAE.

Example 45

The computer-implemented method of example 44, comprising: receiving a BCRAM request, the BCRAM request to include an indication to authenticate the self encrypting drive; and generating the BCAE in response to receiving the BCRAM request.

Example 46

The computer-implemented method of example 44, comprising: generating an arbitrary element; determining a CAE based at least in part on the arbitrary element and a public key, the public key corresponding to a private key from a public/private key pair; and determining the BCAE based at least in part on the CAE.

Example 47

The computer-implemented method of example 46, comprising: determining a padded challenge authentication element (PCAE) based at least in part on the CAE and a padding constant, the padding constant determined based at least in part on a length of the public key; and determining the BCAE based at least in part on the PCAE and the CAE.

Example 48

The computer-implemented method of example 47, the CAE a first CAE, the method comprising: determining an unblind challenge authentication element (UCAE) based on the SBCAE a second CAE and the length of the public key, the second CAE based at least in part on the arbitrary element and the length of the public key; and determining the authentication credentials based at least in part on the UCAE.

Example 49

The computer-implemented method of example 44, comprising decrypting the self encrypting drive based on the authentication credentials.

Example 50

The computer-implemented method of example 44, comprising: determining whether the authentication credentials are valid; and communicating a request for valid authentication credentials to a host based on the determination that the authentication credentials are not valid.

Example 51

The computer-implemented method of example 44, the authentication credentials to include media access keys.

Example 52

The computer-implemented method of example 51, the media access keys to decrypt less than all of the self encrypted drive.

Example 53

A computer-implemented method comprising: receiving a blind challenge authentication element (BCAE) from a self encrypting drive, the BCAE based in part on a public key, the public key corresponding to a private key from a public/private key pair; deriving, by a trusted execution environment (TEE), a signed blind challenge authentication element (SBCAE) based on the private key and a length of the public key; and communicating the SBCAE to the self encrypting drive.

Example 54

The computer-implemented method of example 53, the TEE comprising a secure processor element and a secure computer readable storage.

Example 55

The computer-implemented method of example 53, comprising: receiving at least one authentication factor; determining whether the at least one authentication factor is valid; and deriving the SBCAE based on the determination that the at least one authentication factor is valid.

Example 56

The computer-implemented method of example 53, comprising: receiving a first authentication factor; receiving a second authentication factor; determining whether the first authentication factor is valid; determining whether the second authentication factor is valid; and derive the SBCAE based on the determination that the first authentication factor and the second authentication factor are valid.

Example 57

The computer-implemented method of example 53, comprising: generating the public/private key pair; communicating the public key and a length of the public key to the self encrypting drive; and communicating a request to initialize the self encrypting drive for authentication using a blind challenge authentication mechanism.

Example 58

An apparatus for a device, the apparatus comprising means for performing the method of any one of examples 44 to 57.

The invention claimed is:

1. An apparatus, comprising:
   circuitry at a host computing device coupled to a self-encrypting drive (SED); and
   memory comprising instructions that when executed by the circuitry cause the circuitry to:
   generate, at the host computing device, a blind computation keypair, the blind computation keypair to include a first public key, a first private key, and a first key length;
   generate, at the host computing device, a blind computation challenge signing keypair, the blind computation challenge signing keypair to include a second public key, a second private key, and a second key length;
   sign, at the host computing device, the first public key with the second private key to generate a signed first public key;
   sign, at the host computing device, the second public key with the second private key to generate a signed second public key; and
   generate, at the host computing device, a challenge response authentication mechanism (CRAM) initialization information element comprising an indication of the signed first public key and the signed second public key.

2. The apparatus of claim 1, the instructions when executed further cause the circuitry to utilize the CRAM initialization information element to unlock the SED.

3. The apparatus of claim 2, the instructions when executed further cause the circuitry to utilize the CRAM initialization information element to unlock the SED in response to a resume from a sleep state.

4. The apparatus of claim 1, the CRAM initialization information element comprising an indication of the second public key.

5. The apparatus of claim 1, the CRAM initialization information element comprising an indication of the first key length.

6. The apparatus of claim 1, the CRAM initialization information element comprising an indication of the second key length.

7. The apparatus of claim 1, the CRAM initialization information element comprising indications of the signed first public key, the signed second public key, the first key length, and the second key length.

8. The apparatus of claim 1, the instructions when executed further cause the circuitry to provide the CRAM initialization information element to the SED, the SED to utilize the CRAM initialization information element to generate blind computation factor (BCF) credentials.

9. The apparatus of claim 1, wherein the first key length is 2048 bits, the second key length is 2048 bits, or both the first key length and the second key length are 2048 bits.

10. A method, comprising:
    generating, at a host computing device coupled to a self-encrypting drive (SED), a blind computation keypair, the blind computation keypair including a first public key, a first private key, and a first key length;
    generating, at the host computing device, a blind computation challenge signing keypair, the blind computation challenge signing keypair including a second public key, a second private key, and a second key length;
    signing, at the host computing device, the first public key using the second private key to generate a signed first public key;
    signing, at the host computing device, the second public key with the second private key to generate a signed second public key; and
    generating, at the host computing device, a challenge response authentication mechanism (CRAM) initialization information element comprising an indication of the signed first public key and the signed second public key.

11. The method of claim 10, comprising utilizing the CRAM initialization information element to unlock the SED.

12. The method of claim 11, comprising utilizing the CRAM initialization information element to unlock the SED in response to a resume from a sleep state.

13. The method of claim 10, the CRAM initialization information element comprising an indication of the second public key.

14. The method of claim 10, the CRAM initialization information element comprising an indication of the first key length.

15. The method of claim 10, the CRAM initialization information element comprising an indication of the second key length.

16. The method of claim 10, the CRAM initialization information element comprising indications of the signed first public key, the second public key, the first key length, and the second key length.

17. The method of claim 10, comprising providing the CRAM initialization information element to the SED, the SED to utilize the CRAM initialization information element to generate blind computation factor (BCF) credentials.

18. An article of manufacture comprising a non-transitory storage medium comprising instructions that when executed by circuitry at a host computing device coupled to a self-encrypting drive (SED), enable a system to:
- generate, at the host computing device, a blind computation keypair, the blind computation keypair to include a first public key, a first private key, and a first key length;
- generate, at the host computing device, a blind computation challenge signing keypair, the blind computation challenge signing keypair to include a second public key, a second private key, and a second key length;
- sign, at the host computing device, the first public key with the second private key to generate a signed first public key;
- sign, at the host computing device, the second public key with the second private key to generate a signed second public key; and
- generate, at the host computing device, a challenge response authentication mechanism (CRAM) initialization information element comprising an indication of the signed first public key and the signed second public key.

19. The article of claim 18, the non-transitory storage medium comprising instructions that when executed enable the system to utilize the CRAM initialization information element to unlock the SED.

20. The article of claim 19, the non-transitory storage medium comprising instructions that when executed enable the system to utilize the CRAM initialization information element to unlock the SED in response to a resume from a sleep state.

21. The article of claim 19, the non-transitory storage medium comprising instructions that when executed enable the system to provide the CRAM initialization information element to the SED, the SED to utilize the CRAM initialization information element to generate blind computation factor (BCF) credentials.

22. The article claim 19, wherein the first key length is 2048 bits, the second key length is 2048 bits, or both the first key length and the second key length are 2048 bits.

23. The article of claim 18, the CRAM initialization information element comprising an indication of the second public key.

24. The article of claim 18, the CRAM initialization information element comprising an indication of the first key length.

25. The article of claim 18, the CRAM initialization information element comprising an indication of the second key length.

* * * * *